HEINRICH PRINZ VON PREUSSEN.
APPLIANCE FOR CLEANING WIND SHIELDS ON MOTOR VEHICLES.
APPLICATION FILED APR. 3, 1912.
1,095,468.
Patented May 5, 1914.
2 SHEETS—SHEET 1.
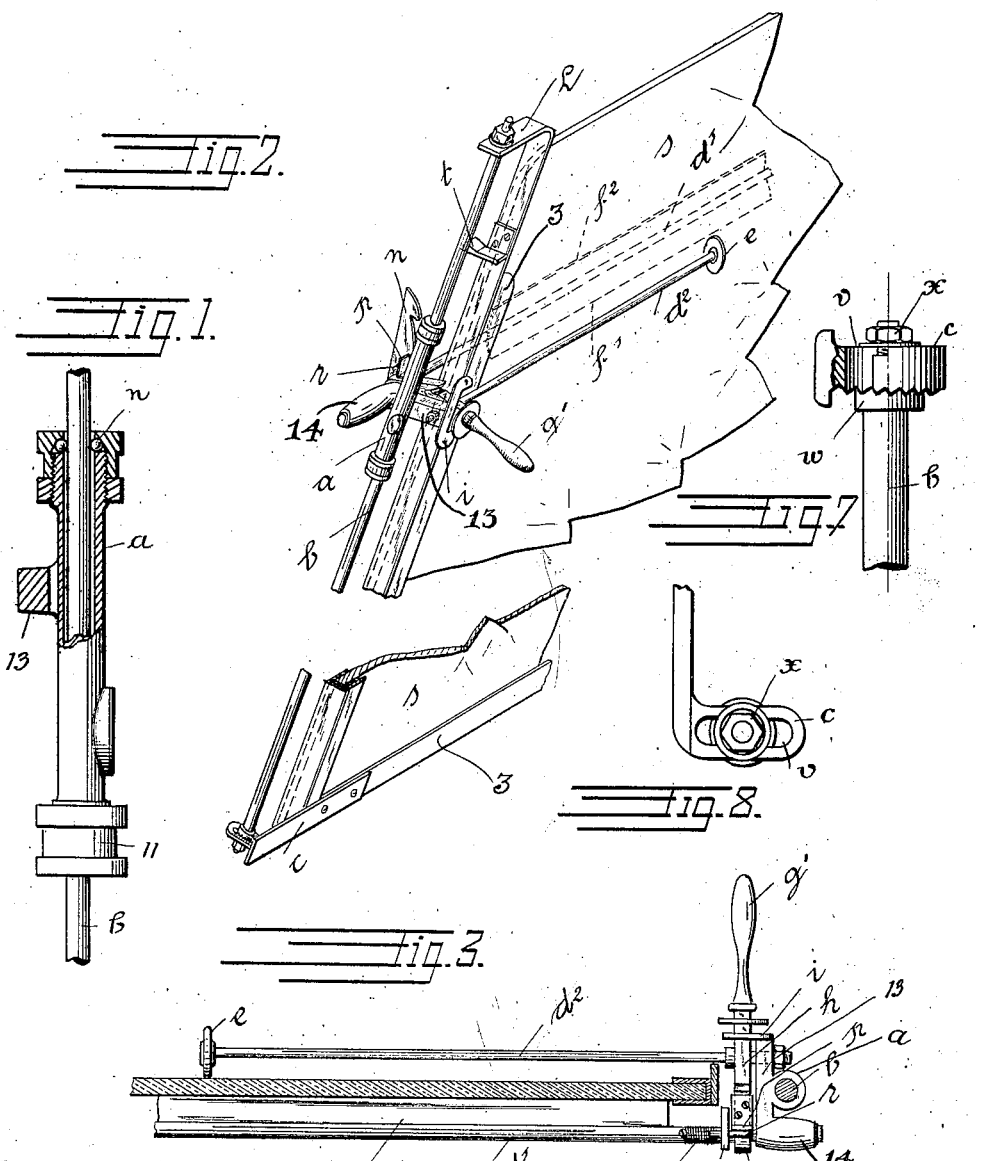

HEINRICH PRINZ VON PREUSSEN.
APPLIANCE FOR CLEANING WIND SHIELDS ON MOTOR VEHICLES.
APPLICATION FILED APR. 3, 1912.
1,095,468.
Patented May 5, 1914.
2 SHEETS—SHEET 2.
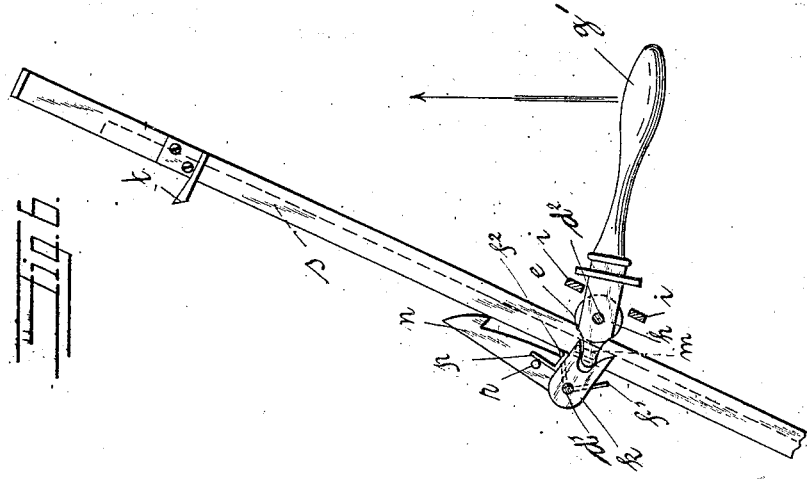
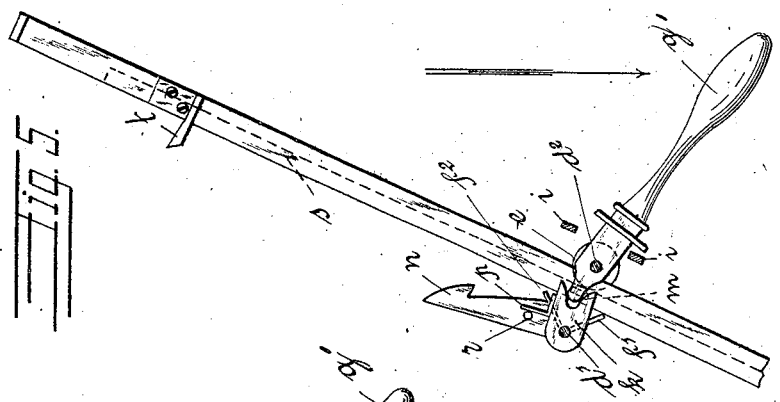
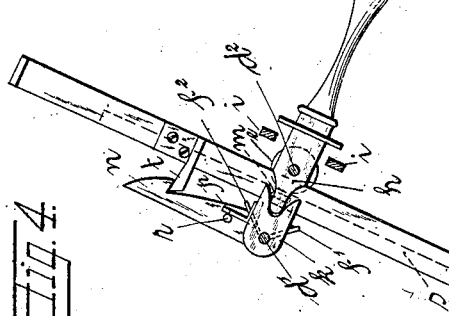
Witnesses:
Inventor:

UNITED STATES PATENT OFFICE.

HEINRICH PRINZ von PREUSSEN, OF KIEL, GERMANY, ASSIGNOR OF ONE-HALF TO THE FIRM OF HEINRICH WOLLHEIM & OSSENBACH, INDUSTRIEGESELLSCHAFT M. B. H., OF BERLIN, GERMANY.

APPLIANCE FOR CLEANING WIND-SHIELDS ON MOTOR-VEHICLES.

1,095,468.  Specification of Letters Patent.  Patented May 5, 1914.

Application filed April 3, 1912. Serial No. 688,320½.

*To all whom it may concern:*

Be it known that I, HEINRICH PRINCE OF PRUSSIA, residing at Kiel, Germany, have invented certain new and useful Improvements in Appliances for Cleaning Wind-Shields on Motor-Vehicles, of which the following is a specification.

In motor vehicles a transparent screen consisting as a rule of a framed pane of glass is usually provided for the protection of the driver, in front of the driver's seat. Besides acting as a wind shield, it also serves for protecting the driver from dust, rain and snow. The serious disadvantage of such shields is that dirt and dust collecting on the shield impair the clear vision and that the rain drops, after striking the shield are flattened out by the wind pressure and moved about on the shield surface, so that in most instances vision through the shield is impossible. I propose to remedy this defect by providing wipers, either on one or on both sides of the glass, which by a quick stroke of the driver may be moved over the glass to remove the adherent dust and water therefrom. Devices for wiping off glass shields are known in the art. The particular advantage of my novel device over those known, however, is its simplicity in construction and the feature that by the up and down stroke the wipers are automatically pressed against the glass without particular effort of the operator to that effect.

I have illustrated my novel device in the accompanying drawings, in which,

Figure 1 illustrates the guiding device for the glass cleaner in connection with which ball bearings are employed, the device being shown partly in longitudinal section. Fig. 2 is a general view in perspective of the cleaning device. Fig. 3 is a horizontal section of the device shown in Fig. 2. Fig. 4 is a side elevation thereof showing the positive connection of the handle with the wiper in the position of rest. Fig. 5 is a similar view, the wiper being moved downward. Fig. 6 is the same view as that shown in Fig. 4, the wiper being moved upward. Fig. 7 is a detail view of the device for adjusting the guide rod in larger scale, and Fig. 8 is a bottom view of the means for fixing the guide rod to the screen or window.

In the drawings $s$ is the glass screen to be cleaned, held in a frame 3, $b$ is the guide rod for the guide sleeve $a$ of the glass cleaner. This rod is fixed on the frame by means of arms L and $c$. The sleeve $a$ as will be seen from Fig. 1, is provided at each end with a ball bearing $u$. Each of these bearing can be so adjusted by means of a screw cap 11 that the balls are clamped more or less against the guide rod $b$.

In view of the fact that the guiding of the sleeve $a$ is effected mainly through the ball bearings, the bore of the sleeve may be made considerably larger than would be required by the cross section of the guide rod $b$. Thus dirt and dust which might get between the sleeve and the rod will not impede the movement of the sleeve on the rod.

The inner face of the lower arm $c$ which carries the guide rod and which is fixed to the frame 3 of the glass, may be advantageously provided with teeth (see Fig. 2) which coöperate with similar teeth provided on a disk $w$. Arm $c$ is further provided with a slot $v$. This arrangement permits of adjustment of the wiper device in a direction at right angles to the glass. The rod $b$ is fixed in position by tightening nut $x$ (Figs. 7 and 8).

The wiper construction is as follows: A rod $d'$ is pivotally arranged in a boss 14 integral with guide sleeve $a$ and carries two wipers $f'$ and $f^2$ set at right angles to each other. These wipers are provided preferably with rubber lining or similar suitable material and the rod $d'$ is disposed on the outside of the window. Another rod $d^2$ is disposed on the inside of the screen and is fixed in a lug 13 also integral with sleeve $a$. The latter rod is of shorter length and carries on its end a guide roller $e$, by means of which it rests on the inner surface of the glass. The handle $g'$ is pivotally disposed on rod $d^2$ and it engages by means of its finger $h$ in a notched arm $k$ rigidly connected with rod $d'$ and thus with the wiper. It will now be seen, that when sleeve $r$ is moved down and up again on rod $b$ by means of handle $g'$ and the latter is thereby tilted at an angle to the glass as shown in Figs. 5 and 6 respectively, wiper $f'$ or $f^2$ respectively is brought in contact with the glass.

The pivotal movement of the handle $g$ is limited by a U-shaped stop piece $i$, fixed on the lug 13. Laterally of plate $k$ a pawl $n$ is rotatably mounted on rod $d'$, and controlled by a spring $o$, so that it engages automatically with a catch $t$ provided near the upper edge of the screen frame 3. Pawl $n$ carries a pin $r$ which engages with an abutment $p$ mounted on plate $k$, when handle $g'$ is tilted into the position shown in Fig. 5, and thereby disengages pawl $n$ from its catch $t$.

The device acts as follows: When the device is in the position of rest the handle $g'$ stands straight at right angles to the glass as shown in Fig. 4, as does also the notched plate $k$. When the wiper is used, the handle $g'$ is pressed downward in the direction of the arrow, as shown in Fig. 5. Abutment $p$ presses against the pin $r$ of pawl $n$ and pushes it away from the catch $t$, so that the cleaner can be moved freely downward. At the same time the wiper $f'$ lies against the glass $s$ so that, when the device is drawn down by means of the handle $g'$ water and grit are pushed downward and the glass cleaned. When the handle $g'$ is turned up again the wiper $f'$ is removed from the glass $s$ and the other wiper $f^2$ placed on the glass, as shown in Fig. 6. If the wiper be now pushed up by means of the handle a further cleaning or polishing of the glass is effected, and again by means of a pushing movement. When the cleaner for example has reached the upper edge of the glass, the pawl engages the catch, whereby the device is prevented from moving downward when the handle is released. At the same time the guide-sleeve $a$ on the vertical guide rod $b$ pushes against the upper bearing at L, so that the wiper cannot be moved up any farther.

What I claim is:

1. A cleaning device for transparent windshields, comprising a slide and a guide therefor a rod extending on each side one of said rods having a supporting roller at its free end and being fixed to said slide at its other end, the other rod being journaled at one end in said slide, wipers attached to said latter rod at an angle to each other, and means for operating said slide.

2. A cleaning device for transparent windshields, comprising a slide and a guide therefor, a rod extending on each side of and in parallel relation to said shield, one of said rods having a supporting roller at its free end and being fixed to said slide at its other end, the other rod being journaled at one end in said slide, wipers attached to said latter rod at an angle to each other, and means for operating said slide and for simultaneously rocking said wipers to alternately contact same with said shield.

3. A cleaning device for transparent windshields, comprising a slide and a guide therefor, a rod extending on each side of and in parallel relation to said shield, one of said rods having a supporting roller at its free end and being fixed to said slide at its other end, the other rod being journaled at one end in said slide, wipers attached to said latter rod at an angle to each other, and a handle pivotally attached to said slide for operating same, a finger on said handle a plate fixed on said wiper rod, having a notch adapted to engage said finger to rock said wiper rod, and alternately contact said wipers with the shield when said slide is operated by said handle.

4. A cleaning device for transparent windshields, comprising a slide and a guide therefor, a rod extending on each side of and in parallel relation to said shield, one of said rods having a supporting roller at its free end and being fixed to said slide at its other end, the other rod being journaled at one end in said slide, wipers attached to said latter rod at an angle to each other, means for operating said slide and for simultaneously rocking said wipers to alternately contact same with said shield, and means for locking said slide in resting position.

5. A cleaning device for transparent windshields, comprising a slide and a guide therefor, a rod extending on each side of and in parallel relation to said shield, one of said rods having a supporting roller at its free end and being fixed to said slide at its other end, the other rod being journaled at one end in said slide, wipers attached to said latter rod at an angle to each other, a handle pivotally attached to said slide for operating same, a finger on said handle, a plate fixed on said wiper rod, having a notch adapted to engage said finger to rock said wiper rod, and alternately contact said wipers with the shield when said slide is operated by said handle, and a spring controlled pawl pivotally attached to said wiper rod, a catch on said shield adapted to engage with said pawl and lock the slide in resting position and means connected with said plate and operated by said handle for disengaging said pawl when the slide is operated.

6. A cleaning device for transparent windshields, comprising a slide and a guide therefor a rod extending on each side of and in parallel relation to said shield, one of said rods having a supporting roller at its free end and being fixed to said slide at its other end, the other rod being journaled at one end in said slide, wipers attached to said latter rod at an angle to each other, and means for operating said slide, one end of said guide rod being adjustable in a direction at right angles to said shield for properly adjusting said wiper rod relatively to said shield.

In testimony whereof I have affixed my signature in presence of two witnesses.

HEINRICH PRINZ von PREUSSEN.

Witnesses:
 JULIUS RINDHOFF,
 ALFRED REIGBER.